Sept. 14, 1954  L. G. VOGEL  2,689,321
CONTROL FOR DOUGH MIXERS
Filed Oct. 30, 1950
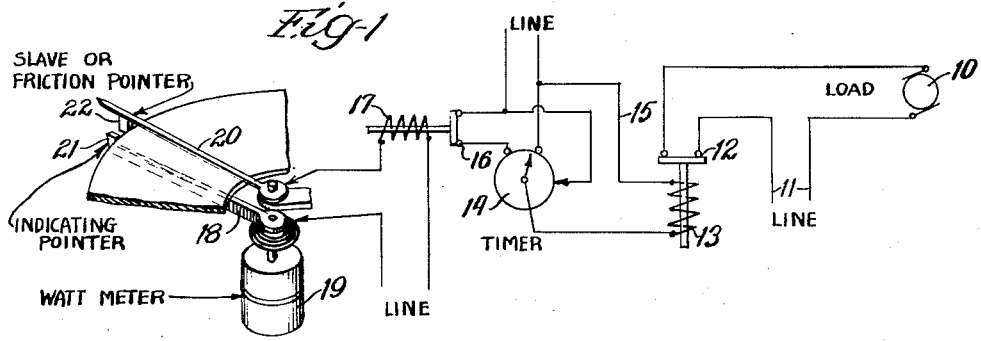
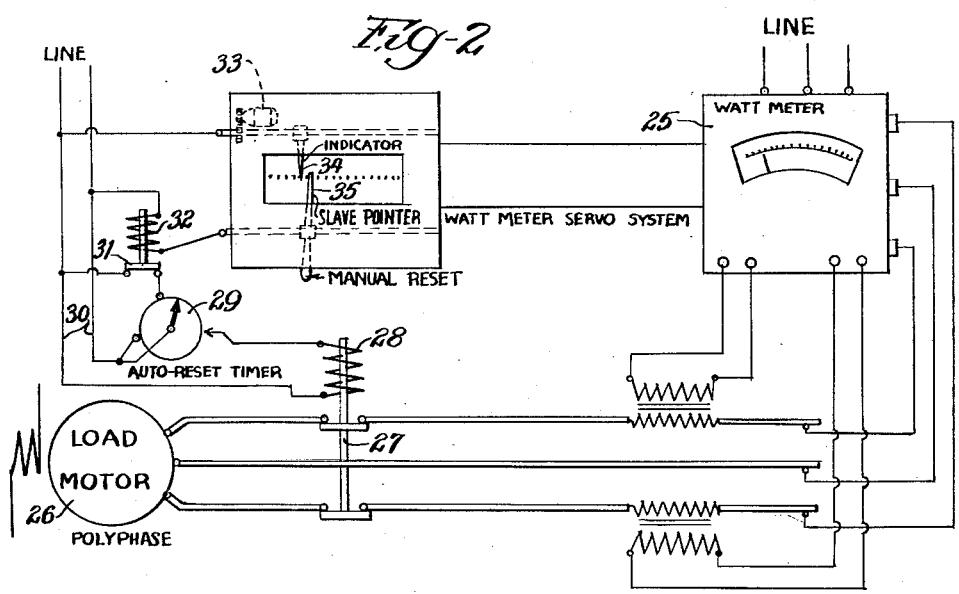
INVENTOR.
Leo G. Vogel Patented Sept. 14, 1954

2,689,321

UNITED STATES PATENT OFFICE 2,689,321

CONTROL FOR DOUGH MIXERS

Leo G. Vogel, Evanston, Ill., assignor to The W. E. Long Co., Chicago, Ill., a corporation of Illinois Application October 30, 1950, Serial No. 192,949

9 Claims. (Cl. 318—474)

1

In making bread, the inter-action of flour and water produces a substance known as gluten, the proper development of which determines the quality of the bread.

In mechanically equipped bakeries, bread dough is mixed in a mechanical mixer driven by an electric motor. A charge of flour and other ingredients is put into the mixer and the motor is started and drives stirrers through the ingredients until the dough is properly worked up and the gluten has been developed to the correct stage, at which time the mixing should be stopped and the dough removed.

If the dough is treated further in the mixer beyond certain short critical limits, the bread is never as good as if the mixer had stopped at the right point of development in the gluten. This is usually determined by an operator, and the human element enters in and supplies many errors and failures. Efforts to provide instruments to tell exactly and accurately the condition of the dough with respect to the development of the gluten have been going on for a long time, but none has been commercially successful.

It has been observed that the power required to drive the mixer decreases with the development of the gluten, and this fact is seized upon to provide automatic means for stopping the mixer motor at the correct stage of development of the gluten.

The decrease in power required precedes the proper development of the gluten by a measurable period, and timing devices should be used to continue the operation of the mixer during that period.

The principal object of this invention is to provide a device or machine to be attached to a mechanical mixer and automatically stop the motor within a selected period of time after the drop of power consumption appears and continues for a period indicating proper development of the gluten. Generally speaking, this is accomplished by connecting a load measuring device through a timer to a switch controlling the circuit of the motor.

In the drawings:

Fig. 1 is a diagram of a load measuring device, such as a watt meter, connected through a reset timer to a switch in the circuit of the mixer motor; and Fig. 2 is a similar diagram in which, instead of having the indicator of the load measuring device act directly on the timer, it acts through an intermediate power device, such as a servomechanism.

In Fig. 1, 10 indicates a motor of a mixer. It is connected across a line 11, 11 in a circuit controlled by a normally closed back contact relay 12 with a coil 13, which is controlled by a timer 14 connected across the line by a circuit 15 including

2 a normally open back contact relay 16, the coil 17 of which is in a circuit across the line and controlled by the indicating pointer 18 of a load measuring device 19 and a slave or friction pointer 20, which is moved in one direction by the indicating pointer 18 but must be manually moved in the opposite direction.

The pointers are equipped with contacts 21 and 22 for closing or opening the circuit, including the solenoid coil 17.

When the motor 10 is started, the indicating pointer 18 swings clockwise or to the right in Fig. 1 and the contact 21 strikes the contact 22, forcing the slave or friction pointer to move with the indicating pointer and maintain the circuit on the timer switch open.

When the load drops, the indicating pointer 18 recedes in a counter-clockwise direction, or to the left in Fig. 1, opening the circuit between the contacts 21 and 22, de-energizing the solenoid 17, and allowing the switch 16 to close the timer circuit, starting the timer.

If the contacts 21 and 22 remain separated for a period selected in setting the timer—for instance, two minutes—the timer will close the circuit 15 for the solenoid coil 13 and open the switch 12 in the circuit of the motor 10.

If, however, the load changes on the increase and the contact 21 closes again with the contact 22 before the two-minute limit is set, the solenoid coil 17 will open the switch 16 and reset the timer 14 for another operation. This will continue as the indicating pointer 18 vacillates until the contact 21 remains away from the contact 22 a period corresponding to the setting of the timer 14, when the motor 10 will be stopped.

Ordinarily, the torque of the load measuring device, such as a watt meter, is too feeble to move the slave or friction pointer 20, and, if made strong enough for that purpose, the measuring system might be too costly for practical purposes. Hence, some sort of power device is introduced between the indicating pointer of the load measuring device and the slave or friction pointer to move the latter in unison with the movement of the indicating pointer. This arrangement is illustrated in Fig. 2, where the watt meter or the like generally indicated by 25 is connected with a load motor 26 by a circuit including a normally closed solenoid switch 27, the coil 28 of which is connected with a timer 29 by a circuit 30 including a solenoid switch 31 having a coil 32 in a circuit controlled by a servomechanism, generally indicated by 33, for operating an indicating pointer 34 and dragging with it a slave or friction pointer 35.

The operation is much the same as described in connection with Fig. 1. Starting the motor 26 puts a load on the line, and the indicating pointer 34 moves to the right in Fig. 2, picking up the slave or friction pointer 35 as it goes to the right. Upon a drop in the power consumption, the action corresponds to that described in connection with Fig. 1.

At the beginning of each operation, the slave or friction pointer will be manually set against the indicating pointer. After that, the operation is automatic until the mixer motor is stopped.

Reset timers, servomechanisms, load measuring devices, etc., are so numerous that it is deemed unnecessary to illustrate or describe them or variations of them.

A selection of servomechanisms is disclosed in "Servomechanism Fundamentals" by Henri Lauer, Robert Lesnick, and Leslie E. Matson, published by McGraw-Hill Book Company, Inc., 1947.

The reset timer suitable for the purposes of this invention is disclosed in my prior patent No. 2,440,647, April 27, 1948, particularly Fig. 5.

I claim:

1. In a dough making machine, means for driving the machine, means for completely cutting off power to the machine when the power being consumed thereby during the mixing operation has decreased to a predetermined amount and for a predetermined period of time as the result of the development of the gluten during the mixing action of the dough material being worked by the machine, said means including a timer, circuit means for said timer, and a power load measuring device for actuating said timer, said power load measuring device being provided with a movable indicator operable upon said predetermined decrease in power consumption by said machine to effect a change in the condition of the circuit to the timer, whereby the timer then operates to completely cut off the power to said machine after the expiration of said predetermined period of time.

2. In a dough making machine, means for driving the machine, means for completely cutting off power to said machine when the power being consumed thereby during the mixing operation has decreased a predetermined amount and for a predetermined period of time as the result of the development of the gluten during the mixing action of the dough material being worked by the machine, said means including a timer, circuit means for said timer, and means for actuating said timer, said last named means including a power load measuring device actuated when said decrease in power consumption occurs, a movable primary indicator connected to said measuring device, and a friction indicator engageable with and operated by said first indicator, contact means in said timer circuit actuated and opened by said indicators when they are in engagement with each other whereby when a decrease in power consumption occurs said indicators will be disengaged and operate to effect a change in the condition of the circuit of the timer, whereupon said timer will then operate to completely cut off power to the mixing machine after the expiration of said predetermined period of time.

3. The combination claimed in claim 2, including a servomechanism connecting the primary and the friction indicators.

4. A power cut-off device for an electrically operated dough mixing machine, comprising the combination of a motor for said machine, switch means for completely cutting off power to said motor, timer means for actuating said switch means, and power load measuring means including a movable indicating pointer and a friction pointer for energizing said timer means when the consumption of power by said motor has decreased a predetermined amount, said decrease in power consumption by said motor in turn being governed by the development of the gluten in the dough material being worked by the mixing machine.

5. The combination claimed in claim 4, including a servomechanism for connecting the indicating pointer and the friction pointer.

6. A power cut-off for an electrically operated dough mixing machine, comprising the combination of a motor for said machine, switch means for completely cutting off power to said motor, timer means for actuating said switch means, circuit means for said timer means, power load measuring means including a movable indicating pointer and a friction pointer for energizing said timer means, contact means in said timer circuit actuated and opened by said indicators when they are in engagement with each other, and means for actuating said measuring means when the consumption of power by said motor has decreased a predetermined amount, whereby said indicators will be disengaged and operate to close the timer circuit, said decrease in power consumption by said motor in turn being governed by the development of the gluten in the dough material being worked by the mixing machine.

7. In dough making equipment, a dough mixer, means for driving the mixer, and automatic means for stopping the mixer, said automatic means including a timing mechanism and being responsive to a predetermined drop in the viscosity of the dough being glutenized and to the existence of said predetermined drop in viscosity for a period of time determined by said timing mechanism.

8. Dough making equipment as set forth in claim 7 in which said timing mechanism has an automatic reset whereby said predetermined drop in viscosity must persist for a selected uninterrupted period of time before said automatic means is effective to stop the mixer.

9. In a dough mixing apparatus, a dough mixer, an electric motor for driving the mixer, automatic means for stopping the motor in response to a predetermined drop in the motor load due to the development of the gluten in the dough, said automatic means including a motor circuit provided with a source of power for the motor, and a control system for stopping the motor in response to said predetermined drop in the motor load, said control system including means responsive to motor load, a relay operated by said load-responsive means for opening the motor circuit when the motor load drops by said predetermined amount, and an automatic reset timing device interposed between the load-responsive means and the motor circuit, whereby the motor circuit is not opened in response to said predetermined drop in motor load unless said drop has persisted for a given period of time.

References Cited in the file of this patent

UNITED STATES PATENTS

| Number | Name | Date |
| --- | --- | --- |
| 1,063,179 | Burnham | June 13, 1913 |
| 1,314,471 | Gow | Aug. 26, 1919 |
| 1,647,316 | Schott et al. | Nov. 1, 1927 |
| 1,701,715 | Batchelder | Feb. 12, 1929 |
| 1,731,373 | Dauler | Oct. 15, 1929 |
| 1,867,280 | Rippl | July 12, 1932 |
| 2,564,553 | Waterstone | Aug. 14, 1951 |